United States Patent [19]
Rowland

[11] 3,830,682
[45] Aug. 20, 1974

[54] RETROREFLECTING SIGNS AND THE LIKE WITH NOVEL DAY-NIGHT COLORATION

[75] Inventor: William P. Rowland, Southington, Conn.

[73] Assignee: Rowland Development Corporation, Kensington, Conn.

[22] Filed: Nov. 6, 1972

[21] Appl. No.: 304,142

[52] U.S. Cl.................. 161/2, 117/33.5 R, 161/4, 350/103, 350/109
[51] Int. Cl............................................. B44f 1/00
[58] Field of Search............... 161/2, 3, 5, 1, 4, ; 117/33.5 R, 33.5 T; 350/103, 109; 404/9

[56] References Cited
UNITED STATES PATENTS

| | | | |
|---|---|---|---|
| 1,805,224 | 5/1931 | Oestnaes | 350/103 |
| 2,481,757 | 9/1949 | Jungersen | 350/103 |
| 3,253,146 | 5/1966 | Uries | 117/33.5 R |
| 3,607,344 | 9/1971 | Baumann | 117/33.5 T |
| 3,684,348 | 8/1972 | Rowland | 350/103 |

*Primary Examiner*—Leon D. Rosdol
*Assistant Examiner*—Edith L. Rollins

[57] ABSTRACT

A retroreflective indicator providing differing day and night coloration is provided by a retroreflective material having a transparent fluorescent dye composition forwardly of the reflective surface which fluoresces light of a first wavelength band and transmits light of a second wavelength band. The retroreflective material has a front face, a body portion of synthetic plastic material and reflective formations disposed inwardly of the front face. Under the diffuse ultravoilet electromagnetic radiation characteristic of sunlight, the indicator will fluoresce a colored light representative of the first wavelength band while under the generally columnar lower frequency electromagnetic radiation characteristic of artificial nightlight provided by automobile headlight beams, the indicator will retroreflect a colored light representative of the second wavelength band.

The dye composition may be dispersed substantially throughout the retroreflective material, or it may be located only in one or more layers thereof. For highway safety signs or markers, the dye composition is desirably one which fluoresces orange in sunlight and retroreflects red at night.

10 Claims, 3 Drawing Figures

RETROREFLECTING SIGNS AND THE LIKE WITH NOVEL DAY-NIGHT COLORATION

BACKGROUND OF THE INVENTION

Since the advent of retroreflective materials, i.e., materials capable of reflecting the bulk of the light rays entering thereinto in a substantially parallel path back towards the source of light, they have found considerable usage in such disparate fields as emergency-warning safety signs and attention-attracting decorative ornaments. Minnesota Mining and Manufacturing Company has sold a material under the trademark SCOTCHLITE which relies upon minute glass spheres embedded in a matrix of synthetic resin to provide such retroreflection. The glass spheres of such retroreflective materials may either be exposed at the front surface of the material or transparently covered, as taught in U.S. Pat. Nos. 2,379,741 and 2,407,680 (granted July 3, 1945 to P.V. Palmquist and Sept. 17, 1946 to P.V. Palmquist, et al., respectively, both assigned to Minnesota Mining and Manufacturing Company). Another type of retroreflective element has a molded member having cube corner formations on one surface thereof, such molded members being formed from glass or synthetic plastic. Molded glass or plastic reflectors such as the STIMSONITE buttons have been widely used for automobile and bicycle reflectors and are illustrated in U.S. Pat. No. 2,022,639 (granted Nov. 26, 1935 to J.C. Stimson). More recently it has been proposed to make and use minute cube corner formations for retroreflective structures as disclosed and claimed in applicant's U.S. Pat. Nos. 3,684,348 and 3,689,346, granted on Aug. 15, 1972 and Sept. 5, 1972, respectively.

As used hereinbelow "daylight" or "sunlight" refers to visible electromagnetic radiation emanating from a source infinitely far removed from a highway safety sign, so that the radiation is diffuse, and with a substantial component in the ultraviolet band. "Nightlight" refers to visible electromagnetic radiation emanating from a source relatively close to a retroreflective surface and aligned with a viewer, so that the radiation is columnar, and without a substantial component in the ultraviolet band. An example of daylight is the sunlight which impinges on a highway safety sign from a broad range of angles, and an example of nightlight is the columnar or reasonably concentrated light beam from an incandescent headlight of an automobile driven by a viewer towards the sign.

If safety signs were to be attention-attracting in both daytime and nighttime according to certain safety standards, it has been necessary to use separate signs for day and night or to construct a composite sign or ornament using two separate attention-attracting surfaces. The daytime sign is made of a fluorescent pigmented material, such as high visibility opaque "Day-Glow" orange-fluorescing pigmented material, for good sunlight visibility. The nighttime sign is made of red colored retroreflective material, such as high visibility red, for good nighttime visibility. If one uses a small flat highway warning sign with a day-surface front and a night-surface rear, it is necessary for the signs to be rotated, either automatically or manually, twice a day.

During daylight hours the ultraviolet radiation characteristic of sunlight is absorbed by the fluorescent pigmented material, which in turn emits the orange or "Day-Glow" color considered most attention-attracting in daylight. On the other hand, because of the characteristic diffuse nature of daylight and the presumed absence of any reasonably concentrated light beam emanating from the direction of the viewer, a retroreflector surface is essentially inoperative in daylight; that is, any retroreflected image is as diffuse as the impinging sunlight and overshadowed by the magnitude of the fluorescing effect. The system is functionally reversed during nighttime when the impinging light (for example, from the high beam of an incandescent automobile headlight) is characteristically columnar; that is, in a reasonably concentrated beam emanating from the direction of the viewer. The light beam entering the front surface of a cube corner retroreflector is eventually directed out of the cube corner formation in a return path through the front surface substantially parallel to its path of entry. The retroreflector sign is usually colored red, the preferred attention-attracting color for nighttime. On the other hand, because of the characteristic columnar nature of nightlight and the typical absence of ultraviolet light from the night environment, the fluorescent pigmented surface of the daylight sign is basically inoperative at night, in any case, any fluorescent effects will be overshadowed by the magnitude of the retroreflective effect caused by the columnar light.

While signs described above are attention-getting in daylight and nightlight, the dual surface requirements makes them expensive to produce, and presents problems of storage or mounting. Furthermore if the surfaces are back-to-back, machinery or personnel are required for rotating the signs. Constructing a parquet of the two different materials is generally not efficient due to the manufacturing expenses involved and the bulk of the resultant composite sign. The overpainting of portions of a retroreflective surface with an opaque "Day-Glow" pigment produces approximately the same results with about the same disadvantages. The overpainted surface is daylight active and the unpainted retroreflective surface is nightlight active; the two surfaces function independently. Unless the retroreflective surface was very broad in the first place, the overpainting of, say, half of the surface with the pigment will severely diminish its utility as a retroreflector, since the surface available for retroreflectivity will be halved; similarly the overpainted strip will necessarily be of limited width so as not to completely cover the retroreflective surface and, because of its narrow width, the strip will be able to produce only limited fluorescent effects.

Accordingly, it is an object of the present invention to produce a novel retroreflective indicator with one reflector surface which may be used in both daytime and nighttime with high attention-gathering ability.

It is also an object to produce such retroreflective indicators providing a single day-and-night surface suitable for use in emergency warning signs, decorative ornamentation and the like, and which is relatively inexpensive in construction.

Another object is to produce such retroreflective indicators which are simple to fabricate and provide in precisely the same area differing day-and-night coloration.

A specific object is to provide an emergency warning sign having a reflector surface which appears bright orange in daytime and bright red at nighttime.

SUMMARY OF THE INVENTION

It has now been found that the foregoing and related objects may be readily attained by the incorporation of a transparent fluorescent dye composition into a retroreflective material. The retroreflective material has a transparent front or outer face, a body portion of synthetic plastic resin therebehind, and a plurality of retroreflective formations disposed inwardly of the front face of the body portion. The dye composition is disposed forwardly of the reflective formations and the retroreflective material is transparent to light rays entering the front face and passing to the reflective formations through the dye composition.

The transparent fluorescent dye composition is selected for its ability to fluoresce light of a first wavelength band and transmit light of a second wavelength band. Accordingly, the diffuse ultraviolet electromagnetic radiation characteristic of sunlight will cause the indicator to fluoresce a colored light representative of the first wavelength band, while the generally columnar lower frequency electromagnetic radiation characteristic of artificial nightlight (e.g., the beams from an incandescent automobile headlight) will cause the indicator to retroreflect a colored light representative of the second wavelength band. The suitable dyes, such as the rhodamine and fluorescein dyes, absorb all but a narrow wavelength band of the impinging artificial nightlight, and permit only light of this wavelength band to enter the reflective formations of the retroreflective material. The preferred dye compositions fluoresce bright orange and transmit bright red so as to be attentiongetting both in sunlight and in nightlight.

DESCRIPTION OF THE PREFERRED EMBODIMENTS

Figure 1:
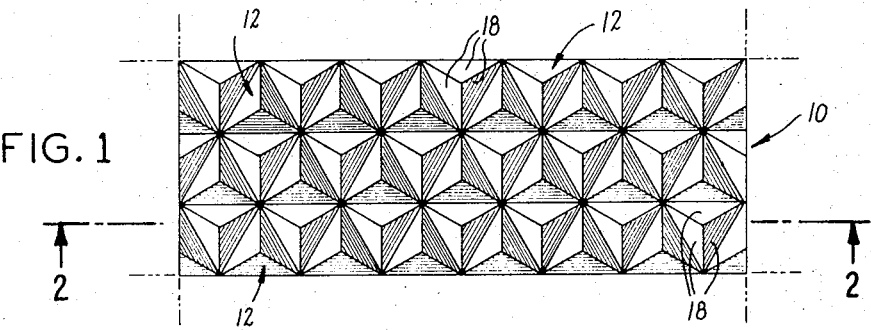
FIG. 1 is a fragmentary rear view of retroreflective material embodying the present invention.
Figure 2:
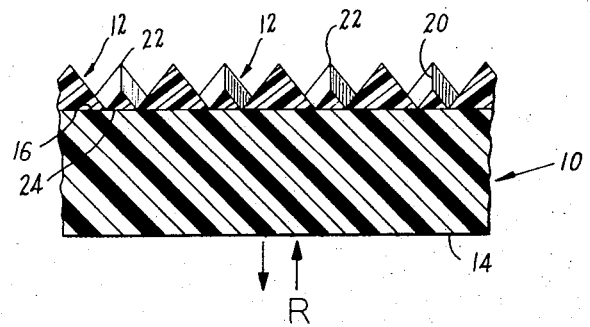
FIG. 2 is a fragmentary sectional view of the retroreflective material along the line 2—2 of FIG. 1.

Turning first to FIGS. 1 and 2 of the attached drawing, therein illustrated is a preferred composite retroreflective material embodying the present invention and comprised of a body portion generally designated by the numeral 10 and a multiplicity of cube corner formations generally designated by the numeral 12. The body portion 10 has two parallel smooth surfaces 14 and 16, the surface 16 having bonded thereto the cube corner formations 12, and the front or outer surface 14 being exposed in the composite structure. The body portion 10 is formulated from material containing the fluorescent orange and red dye composition hereinafter described in detail.

As best seen in FIG. 1, the cube corner formations 12 each have three planar faces 18 which are disposed in planes perpendicular to each other and intersecting along side edges 20. The apex 22 of each formation is vertically aligned with the center of the base 24 thereof as is best seen in FIG. 2. The cube corner formations 12 are arranged in a pattern providing rows and columns, and the center-to-center spacing between the apices 22 of the cube corner formations 12 along the rows and columns is in accordance with a regular pattern to insure close spacing and avoid substantially any flat areas therebetween. Since the cube corner formations 12 are so configured, a non-ultraviolet light ray R entering the front surface 14 of the composite material passes through the body portion 10 incorporating the dye composition. All of the wavelengths of light ray R representing non-red color are absorbed and only the wavelengths representing red color are transmitted through the body portion into a cube corner formation 12. When it strikes one of the planar faces 18, it is directed to another of the planar faces 18 which in turn reflects the ray to the third planar face 18. The ray is then directed out the cube corner formation 12 in a return path so that its path back through the body portion 10 and out through the front surface 14 is substantially parallel to its path of entry. This is the principle of retroreflection; as a result, it is extremely critical that the dimensions and angles of the cube corner formations 12 be closely controlled. Because of the light filtering effect, the color of the returning ray is red.

It must be noted that the description of the journey of light ray R immediately above presupposes that the ray is not an ultraviolet ray. If the light ray R were instead of the ultraviolet wavelength band or a mixture of bands including ultraviolet, as is sunlight, when the ray R passed through the body portion 10 containing the dye composition, the ultraviolet bands would be absorbed by the fluorescent dye therein. The thus excited fluorescent dye would fluoresce to relieve the excitation, thereby emitting rays of bright orange light in all directions, including some going back through the body portion 10 and out through front surface 14 substantially parallel to the entry path of light ray R. The light ray R would usually be very diffuse in daylight so that a substantial proportion of the entering light rays would not be at an appropriate angle for retroreflection, although they would be at a suitable angle for causing fluorescence. Accordingly, the orange fluorescent effect is of such intensity that it overshadows any minor diffuse red retroreflective effects caused by any diffuse non-ultraviolet rays.

Figure 3:
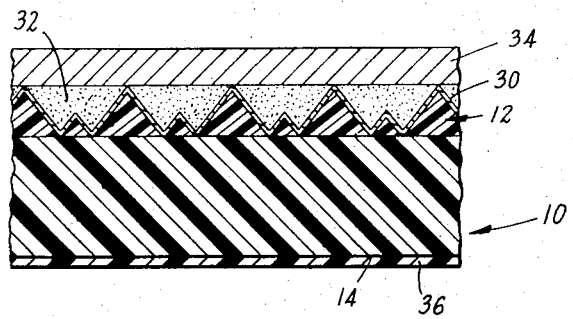
FIG. 3 is a view similar to that in FIG. 2 illustrating an embodiment having an adhesive coating and release paper thereon.

Turning now to FIG. 3, therein illustrated is an embodiment of the invention wherein the basic composite material includes further elements to permit its affixation to support surfaces by adhesion and an applied coating or film carrying the dye composition and covering front surface 14. The basic composite material of FIGS. 1 and 2 is employed herein (and the reference numerals are the same), except that the dye composition is not incorporated in main body portion 10. Instead it is incorporated in a thin plastic coating or film 36 applied over the front surface 14. A reflective coating 30 is applied to the surface of the cube corner formations 12 conveniently by metallizing or by applying a suitable lacquer thereto. Deposited over the back surface of the composite material is a coating 32 of an ever tacky adhesive and a release paper 34 is then loosely adhered thereon. To mount this structure on a suitable surface, the release paper 34 is removed and the composite material is pressed thereagainst so that the adhesive coating 32 will adhere thereto. Since the faces 18 of the cube corner formations 12 have the reflective coating 30 thereon, light rays are still reflected therefrom.

As has been previously indicated, the preferred cube-corner retroreflective materials utilize minute cube corner formations which are closely spaced so as to avoid substantially any smooth or flat areas therebetween. Although the cube corner formations may have a side edge dimension of up to 0.025 inch, the preferred structures utilize a side edge dimension of not more than 0.010 inch and most desirably on the order of 0.004–0.008 inch. The thickness of the body portion of the composite structure may vary considerably depending upon the application. Generally, it is preferred to use sheet material having a thickness of 0.002–0.030 inch and most desirably about 0.003–0.010 inch. The preferred composite retroreflective synthetic plastic materials briefly described above, as well as their methods of manufacture, are more fully described in the aforementioned U.S. Pat. Nos. 3,684,348 and 3,689,346. These retroreflective materials are highly retroreflective of substantially columnar light; that is, light beams having angles of incidence to the front surface of up to 45°.

The retroreflective material may be injection-molded acrylic type retroreflectors of the kind described in the aforementioned U.S. Pat. No. 2,022,639 or the glass bead type retroreflectors of the exposed and covered kinds described in aforementioned U.S. Pat. Nos. 2,379,741 and 2,407,680, all of these materials and their methods of manufacture being well-known to those skilled in the art. It is to be understood that the functionally active reflective formations for the cube corner type reflectors are their perpendicular walls and for the bead reflectors a reflective coating on the rear surface of the glass beads or spheres.

The dye composition will contain a transparent fluorescent dye which fluoresces light of one wavelength band (color) and transmits light of another wavelength band (color). (To fluoresce means to absorb light in the ultraviolet band and to radiate light of a different, usually lower band due to the return of electrons, displaced by the exciting radiation, to a more stable position). These dyes include the rhodamine dyes (such as those sold under the designation Rhodamine B Extra (Colour Index Number-Basic Violet 10) and Rhodamine 6DGN (Colour Index Number-Basic Red 1) by GAF Corporation) and the fluorescein dyes (sold under the designation Fluorol 7GA by the same corporation). These and other dyes similarly useful in the practice of the present invention are described in Organic Chemistry, by I. L. Finar, pp. 648–9, (Longmans, Green and Co., London, New York, Torronto, 1951). The chemical formulations of these dyes are extremely complex, the rhodamine dyes being a hydrochloride of diethyl-m-amino-phenyolphthalein and the fluorescein dye being a xanthene derivative. The dyes above have the Color Index Numbers assigned to them in the Colour Index published by The Society of Dyers and Colourists of England and The American Association of Textile Chemists and Colorists. The Rhodamine B Extra may be described as the product of condensation of m-diethyl aminophenol with phthallic acid anhydride and is assigned Colour Index Structure Number 45170. The dye designated Rhodamine 6DGN may be described as the product of condensation of 3-ethylamino-p-cresol with phthallic acid anhydride and esterification with ethanol and a mineral acid; it is assigned Colour Index Structure Number 45160. While other transparent fluorescent dyes known in the art to have the aforementioned properties may be used, it is preferred that the transparent fluorescent dyes be selected from the group consisting of rhodamine and fluorescein dyes.

Any of the transparent fluorescent dyes may be mixed with other transparent dyes (whether fluorescent or not) to produce a transparent fluorescent dye composition having desirable properties. For example, the use of a transparent fluorescent dye composition consisting exclusively of Rhodamine B Extra produces a retroreflective indicator with day and night colorations which are somewhat different, but both colorations are too purple-red to be optimally attention-getting either in daytime or in nighttime. On the other hand, a mixture of the Rhodamine B Extra with a transparent fluorescent orange dye (sold under the designation Amaplast Orange LFP by the American Aniline Corporation and bearing Colour Index Number - Solvent Orange 60) provides a transparent fluorescent dye composition which, when embodied in the present invention, fluoresces a bright orange in sunlight and transmits (and therefore retroreflects) a bright red in columnar nightlight.

The transparent fluorescent dye compositions are conveniently incorporated in the retroreflective materials in a variety of different ways. Referring now to FIG. 3, a transparent lacquer or plastic film 36 incorporating the dye composition is applied to the then smooth front surface 14 of the retroreflective material and the film 36 then becomes itself a new front surface for the material. Alternatively, the dye composition may conveniently be dissolved in a volatile solvent and the resultant solution liberally painted onto exposed surface 14 so as to penetrate outer surface 14 and diffuse into main body portion 10. After evaporation of the solvent, the outer surface 14 and part of body portion 10 incorporate the dye composition. This technique may be used for providing signs or patterns where the colors stand out from a background.

The transparent fluorescent dye composition may simply be blended into the material forming the reflective elements 12 (for example, the cubecorners, lenses, or glass bead reflective elements). Referring now to FIG. 2, the dye composition is conveniently incorporated exclusively in the synthetic plastic resin formulation from which will be made the separately-formed smooth body portion 10 to which is bonded a multiplicity of minute cube-corner formations 12 closely spaced about and projecting therebehind.

The critical limitation on the method of embodying the dye composition within the retroreflective material is that the dye must be situated forwardly of the reflective formations so that an impinging light ray R entering the front face of the material can pass to the reflective formations only through the dye composition. In this manner, depending on the wavelength of the light ray, the dye composition will either absorb the radiation and fluoresce light of one coloration or pass through (i.e., transmit) to the reflective formations a wavelength band representing light of another coloration.

Illustrative of the present invention are the following specific examples wherein there are provided the novel retroreflective indicators providing differing sunlight and nightlight coloration.

EXAMPLE ONE

One gram of a fluorescein dye sold by GAF Corporation under the designation Fluorol 7GA a xanthene derivative assigned Colour Index Fluorescent Brightener No. 75 is dissolved in 100 grams of methyl acetate solvent to form a solution which is then painted onto the entire front surface of a transparent vinyl cube-corner retroreflective material of the type illustrated in FIG. 2. The volatile solvent is permitted to evaporate leaving the dyed retroreflective material. When illuminated with an incandescent lamp indoors, the retroreflective indicator appears as amber yellow (the color used in yellow caution signs); when viewed in the presence of ultraviolet light outdoors, the same material fluoresces a brilliant eye-catching yellowish-green.

EXAMPLE TWO

A similar solution is prepared using a rhodamine dye sold by GAF Corporation under the designation Rhodamine 6DGN and applied as in Example One. When tested as above, the outdoor color is orange, and the indoor color is red-orange.

EXAMPLE THREE

A film mix is prepared according to the following formulation by weight:
100 parts poly-vinyl chloride resin
39 parts N-octyldecylphthalate plasticizer
5 parts epoxy plasticizer and heat stabilizer sold by Rohm & Haas under the designation G62
3 parts barium-cadmium heat stabilizer sold by Tenneco Inc. under the designation Nuostab 1022
0.5 parts stearic acid lubricant
To 50 lbs. of the above formula mix is added:
35 grams transparent fluorescent red dye sold by GAF Corporation under the designation Rhodamine B Extra, and
21 grams transparent orange dye sold by American Aniline Corporation under the designation Amaplast Orange LFP.
The mix is then calendered to provide a film 12 mils in thickness. Portions of the resultant fluorescent transparent flexible vinylchloride film are laminated over the front surface of a variety of retroreflective materials including a cube-corner retroreflective sheet of the type shown in FIG. 2, an injection-molded acrylic button of the type shown in U.S. Pat. No. 2,022,639, and a glass bead retroreflective material of the type shown in U.S. Pat. No. 2,379,741. The laminates thus produced appear an attention-attracting "Day-Glow" orange when the film surface is exposed to diffuse ultraviolet light and an attention-attracting bright red upon exposure to columnar artificial light indoors.

As representatively illustrated in the preceding examples, a variety of different fluorescent transparent dye compositions can be embodied in a variety of different retroreflective materials in a variety of different ways—always forwardly of the reflective formations—to produce a retroreflective indicator having different day and night coloration. The dye composition utilized in Example 3—that is, a mixture of from 1 to 2 parts rhodamine dye to 1 part by weight of transparent orange dye—was found to produce indicators having the most attention-attracting colors; for day/night usages in highway safety applications that is, bright orange in sunlight and a bright red in artificial light.

Thus, it can be seen from the foregoing detailed specifications and examples that the present invention provides a retroreflective indicator which offers, in precisely the same area of a single surface, differing day-and-night coloration suitable for use in decorative ornaments and warning signs. By selection of appropriate dyes for use in the present invention, a retroreflective indicator may be created with the high attention-gathering colors specifically found most suitable for day or night use, usually a bright fluorescent orange for day use and a bright red for night use. Furthermore, the dye compositions may be applied to the retroreflective material by a variety of economical techniques: as part of the material from which the retroreflective material (or a portion thereof) is being formed, as a laquer or plastic film applied as a front surface for the retroreflective material, or as a solution which is painted onto the retroreflective absorbed by its surface and upper layers. The capability of applying the dye composition as a film or solution to the front surface of to a pre-existing retroreflective material makes it especially simple and economical to provide signs in which either a message area or the background area for the message is so treated with the dye composition as to stand apart from the remainder of the sign by virtue of the differing day/night coloration of the treated area.

Having thus described the invention, we claim:

1. A retroreflective indicator providing differing day and night coloration comprising a retroreflective material having:
   a. a front face;
   b. a body portion of transparent synthetic plastic resin;
   c. reflective formations selected from the groups consisting of cube corner and spherical formations disposed inwardly of said front face; and
   d. a transparent fluorescent dye composition disposed in said retroreflective material forwardly of said reflective formations, said material being transparent to light rays entering said front face and passing to said reflective formations through said dye composition, said dye composition fluorescing light of a first wavelength band and transmitting light of a second wavelength band;
   whereby the ultraviolet electromagnetic radiation characteristic of sunlight causes said indicator to fluoresce a colored light representative of said first wavelength band and the columnar incandescent electromagnetic radiation characteristic of nightlight causes said indicator to retroreflect a colored light representative of said second wavelength band.

2. The retroreflective indicator of Claim 1 wherein said front face is substantially planar and said reflective formations are spaced therefrom by resin of said body portion and wherein said dye composition is disposed in said body portion.

3. The retroreflective indicator of claim 1 wherein said dye composition is located exclusively in a coating providing said front face of said material.

4. The retroreflective indicator of claim 1 wherein said dye composition includes a fluorescent dye selected from the group consisting of rhodamine and fluorescein dyes.

5. The retroreflective indicator of claim 4 wherein said dye composition is a mixture of from about 1 to 2 parts by weight of rhodamine dye and 1 part of transparent fluorescent orange dye, whereby sunlight causes said indicator to fluoresce light of orange coloration and nightlight causes said indicator to retroreflect light of red coloration.

6. The retroreflective indicator of claim 1 wherein said front face is planar and said reflective formations are spaced therefrom by said body portion and said reflective formations comprise projections on the face of said body portion opposite said front face.

7. The retroreflective indicator of claim 6 wherein said reflective formations are comprised of a multiplicity of minute, closely spaced cube corner formations.

8. The retroreflective indicator of claim 6 wherein said indicator has a reflective coating on a surface of said projections.

9. The retroreflective indicator of claim 6 wherein said dye composition is disposed in at least said body portion.

10. The retroreflective indicator of claim 6 wherein said reflective formations are comprised of a multiplicity of minute, closely spaced cube corner formations; said dye composition is disposed in at least said body portion; and said indicator has a reflective coating on a surface of said projections.

* * * * *